(12) United States Patent
Lim (10) Patent No.: US 7,294,665 B1
(45) Date of Patent: Nov. 13, 2007

(54) MOISTURE CURABLE COMPOSITIONS WITH ENHANCED ADHESION TO POLYOLEFINS

(75) Inventor: Thomas Fay-Oy Lim, Killingworth, CT (US)

(73) Assignee: Henkel Corporation, Rocky Hill, CT (US)

( * ) Notice: Subject to any disclaimer, the term of this patent is extended or adjusted under 35 U.S.C. 154(b) by 567 days.

(21) Appl. No.: 10/799,761

(22) Filed: Mar. 15, 2004

(51) Int. Cl.
*C08L 21/00* (2006.01)

(52) U.S. Cl. ............... 524/461; 524/866; 524/588; 528/32

(58) Field of Classification Search ........... 524/261, 524/866, 588; 528/32
See application file for complete search history.

(56) References Cited

U.S. PATENT DOCUMENTS

2003/0153671 A1 * 8/2003 Kaszubski et al. .......... 524/492

2005/0211580 A1 * 9/2005 Kaszubski et al. .......... 206/223

FOREIGN PATENT DOCUMENTS

| EP | 0 106 330 A1 | * | 4/1984 |
| EP | 0 442 380 B1 | * | 8/1991 |
| EP | 0 673 972 A1 | * | 9/1995 |
| EP | 1 279 709 A1 | * | 1/2003 |
| JP | 62-039646 | * | 2/1987 |
| JP | 04-57850 | * | 2/1992 |
| JP | 06-057122 | * | 1/1994 |

* cited by examiner

*Primary Examiner*—Katarzyna Wyrozebski
(74) *Attorney, Agent, or Firm*—Steven C. Bauman (57) ABSTRACT

Moisture curable compositions that include alkoxysilyl capped polymer compounds and alkylsilyl capped plasticizers adhesively cure to polyolefin substrates, including polyethylene and polyolefin substrates. The compositions are curable at room temperature or at temperatures greater than room temperature. The compositions further include an adhesion promoter, a filler or a moisture curing catalyst.

23 Claims, 1 Drawing Sheet

MOISTURE CURABLE COMPOSITIONS WITH ENHANCED ADHESION TO POLYOLEFINS

FIELD OF THE INVENTION

The present invention relates to moisture curable compositions with enhanced adhesion to polyolefin substrates. More particularly, the present invention relates to moisture curable silicone polymer-containing compositions exhibiting enhanced adhesion to polyethylene and polypropylene substrates.

BRIEF DESCRIPTION OF RELATED TECHNOLOGY

Alkoxysilylated polymers, in the presence of a catalyst, can be crosslinked by atmospheric moisture under ambient conditions. Compositions based on these types of polymers are often referred to as RTV adhesives (or sealants). The most well known example is the RTV silicone adhesives or sealants. Such silicone adhesives or sealants are generally durable and have excellent resistance to weathering and temperature extremes.

While cyanoacrylates, hot melts, epoxies, urethanes and two-part acrylics are commonly used as adhesives on plastic substrates, often times they are used with primers, in effect rendering them two-part adhesive systems. Physical treatments, such as surface roughening, plasma treatment, thermal treatment, among others, are other ways often used to improve adhesive wetting on polyethylene (PE) and polypropylene (PP) surfaces, but such treatments are often expensive and time consuming and do not necessarily provide the desired effect of enhanced bonding.

Alkoxysilylated polymers have not been generally used on plastic substrates, particularly polyethylene and polypropylene substrates, due to poor adhesive wetting characteristics on these substrates.

Thus, there is need for alkoxysilylated polymer-containing compositions with enhanced adhesion properties to plastic substrates, which do not require priming or physical surface treatment.

SUMMARY OF THE INVENTION

Moisture curable compositions useful for adhesively bonding polyolefins, including polyethylenes and polypropylenes, include:

(a) alkoxysilyl capped polymer compounds within the following formula:

I wherein R is a hydrocarbon diradical which may include heteroatom and/or silicone-containing groups or linkages; A and A' are each $C_{1-30}$ linear or branched, substituted or unsubstituted aliphatic groups or aromatic-containing groups, with or without interruption by a carboxy, carbamate, carbonate, ureido, urethane or sulfonate linkage; n may be 0 or 1; $R^1$ and $R^2$ are substituted or unsubstituted $C_{1-12}$ alkyl or aryl groups; $R^3$ is a $C_{1-12}$ alkyl, alkenyl, alkoxy, aminoalkyl or aryl group, or a (meth)acryloxyalkyl group;

(b) at least one alkylsilyl capped plasticizer within the following formula:

II wherein R' is a hydrocarbon diradical which may include heteroatom and/or silicone-containing groups or linkages; B and B' may be each $C_{1-30}$ linear or branched, substituted or unsubstituted aliphatic groups or aromatic-containing groups, with or without interruption by a carboxy, carbamate, carbonate, ureido, urethane or sulfonate linkage; m may be 0 or 1; $R^4$ and $R^5$ are substituted or unsubstituted $C_{1-12}$ alkyl or aryl groups; $R^6$ is a $C_{1-12}$ alkyl, alkenyl, alkoxy, aminoalkyl or aryl group, or a (meth)acryloxyalkyl group;

(c) an adhesion promoter;

(d) a filler present; and (e) a moisture curing catalyst.

Polyether backbones, i.e., the "R" in Formula I above, including polypropylene oxide backbones, are useful for the alkoxysilyl capped polymer compounds of the present invention. Trialkoxysilyl capped polymer compounds, where "$R^3$" in Formula I above is a $C_{1-12}$ alkoxy, are also useful.

Polyether backbones, i.e., the "$R^1$" in Formula II above, including polytetramethylene oxide backbones, are useful for the alkylsilyl capped polymer compounds of the present invention. Trialkylsilyl capped polymer compounds, where "$R^6$" in the Formula II above is a $C_{1-12}$ alkyl, are also useful.

Desirably, the filler is a calcium carbonate filler present in from about 10 weight percent to about 70 weight percent on a total composition basis.

In another aspect of the present invention moisture curable compositions are provided that include:

(a) from about 5 weight percent to about 99 weight percent on a total composition basis of trialkoxysilyl capped polymer compounds within the following structure:

I wherein R is a hydrocarbon diradical which may include heteroatom and/or silicone-containing groups or linkages; A and A' are each $C_{1-30}$ linear or branched, substituted or unsubstituted aliphatic groups or aromatic-containing groups, with or without interruption by a carboxy, carbamate, carbonate, ureido, urethane or sulfonate linkage; n may be 0 or 1; $R^1$ and $R^2$ are substituted or unsubstituted $C_{1-12}$ alkyl or aryl groups; $R^3$ is a $C_{1-12}$ alkoxy group;

(b) from about 0 weight percent to about 35 weight percent on a total composition basis of trialkylsilyl capped polymeric plasticizers within the following structure:

wherein R' is a hydrocarbon diradical which may include heteroatom and/or silicone-containing groups or linkages; B and B' may be each $C_{1-30}$ linear or branched, substituted or unsubstituted aliphatic groups or aromatic-containing groups, with or without interruption by a carboxy, carbamate, carbonate, ureido, urethane or sulfonate linkage; m may be 0 or 1; $R^4$ and $R^5$ are substituted or unsubstituted $C_{1-12}$ alkyl or aryl groups; $R^6$ is a $C_{1-12}$ alkyl, alkenyl or aryl group;

(c) from about 1 weight percent to about 5 weight percent on a total composition basis of an aminopropyltrimethoxysilane adhesion promoter;

(d) from about 10 weight percent to about 70 weight percent on a total composition basis of a calcium carbonate filler; and (f) a moisture curing catalyst.

Methods for bonding polyolefin substrates and articles so formed are also described.

DETAILED DESCRIPTION OF THE INVENTION

Moisture curable compositions of the present invention exhibit enhanced adhesion to polyolefins, including polyethylene and polypropylene. The moisture curable compositions of the present invention include (a) alkoxysilyl capped polymers, (b) alkylsilyl capped polymers, (c) fillers, (d) moisture curing catalyst, and (e) adhesion promoter.

Useful alkoxysilyl capped polymers include those compounds of the following formula:

wherein R is a hydrocarbon diradical which may include heteroatom and/or silicone-containing groups or linkages; A and A' may be each $C_{1-30}$ linear or branched, substituted or unsubstituted aliphatic groups or aromatic-containing groups, with or without interruption by a carboxy, carbamate, carbonate, ureido, urethane or sulfonate linkage; n may be 0 or 1; $R^1$ and $R^2$ are substituted or unsubstituted $C_{1-12}$ alkyl or aryl groups; $R^3$ is a $C_{1-12}$ alkyl, alkenyl, alkoxy, aminoalkyl or aryl group, or a (meth)acryloxyalkyl group.

Additionally examples of R backbones include alkyd resins, oil modified alkyd resins, unsaturated polyesters, natural oils, (e.g., linseed, tung, soybean), epoxides, nylons, thermoplastic polyester (e.g., polyethyleneterephthalate, polybutyleneterephthalate), polycarbonates, i.e., thermoplastic and thermoset, polyethylenes, polybutylenes, polystyrenes, polypropylenes, ethylene propylene co- and terpolymers, acrylics (homopolymer and copolymers of acrylic acid, acrylates, methacrylates, acrylamides, their salts, hydrohalides, etc.), phenolic resins, polyoxymethylene (homopolymers and copolymers), polyethylene oxides, polypropylene oxides, polybutylene oxides or polytetramethylene oxides, polyurethanes, polysulfones, polysulfide rubbers, nitrocelluloses, vinyl butyrates, vinyls (vinyl chloride and/or vinyl acetate containing polymers), ethyl cellulose, the cellulose acetates and butyrates, viscose rayon, shellac, waxes, ethylene copolymers (e.g., ethylenevinyl acetate copolymers, ethylene-acrylic acid copolymers, ethyleneacrylate copolymers), organic rubbers, silicone greases, resins and rubbers and the like.

R may also include natural rubber; those formed from the homopolymerization of butadiene and its homologues and derivatives such as: cis-1,4-polyisoprene; 3,4-polyisoprene; cis-1,4-polybutadiene; trans-1,4-polybutadiene; 1,2-polybutadiene; and those formed from the copolymerization of butadiene and its homologues and derivatives with one or more copolymerizable monomers containing ethylenic unsaturation such as styrene and its derivatives, vinylpyridine and its derivatives, acrylonitrile, isobutylene and alkyl-substituted acrylates such as methylmethacrylate. Examples include styrene-butadiene copolymer rubber composed of various percentages of styrene and butadiene and employing the various isomers of butadiene as desired (hereinafter "SBR"); terpolymers of styrene, isoprene and butadiene polymers, and their various isomers; acrylonitrile-based copolymer and terpolymer rubber compositions; and isobutylene-based rubber compositions; or a mixture thereof, as described in, for example, U.S. Pat. Nos. 4,530, 959; 4,616,065; 4,748,199; 4,866,131; 4,894,420; 4,925, 894; 5,082,901; and 5,162,409.

Other suitable organic polymers useful as R backbones are copolymers of ethylene with other high alpha olefins such as propylene, butene-1 and pentene-1 and a diene monomer. The organic polymers may be block, random, or sequential and may be prepared by emulsion (e.g. e-SBR) or solution polymerization processes (e.g. s-SBR). Additional polymers which may be used include those which are partially or fully functionalized including coupled or starbranched polymers. Additional specific examples of functionalized organic rubbers include polychloroprene, chlorobutyl and bromobutyl rubber as well as brominated isobutylene-co-paramethylstyrene rubber. The preferred organic rubbers are polybutadiene, s-SBR and mixtures thereof.

Silicone rubbers which are useful as R include organic polysiloxane compositions in which the organic polysiloxane is linear or branched, and optionally may contain, in addition to the hydrocarbon groups, certain reactive groups such as for example, hydroxyl, hydrolyzable groups, alkenyl groups such as vinyl, hydrogen, fluoro, and phenyl. Further examples are given in U.S. Pat. No. 5,009,874, the disclosures of which is, in its entirety, incorporated herein by reference.

Other useful R backbone polymers include acrylonitrile-butadiene rubber (NBR), fluorine-containing rubber, epychlorohydrin rubber, butyl rubber, halogenated butyl rubber, brominated isobutylene/p-methylstyrene copolymer rubber, chloroprene rubber, ethylene/acrylate copolymer rubber and epoxidized natural rubber, ethylene/propylene/diene rubber (EPDM) and the like. Additional details of useful alkoxysilyl capped polymers are described in WO 02/068501 A2, the contents of which are incorporated herein by reference.

The alkoxysilyl capped polymers of the present invention desirably have a viscosity in the range of about 10 cps to about 1,000,000 cps and more desirably about 1,000 cps to about 100,000 cps.

Desirably, in formula I, R represent a polyether such as a polyethylene oxide, polypropylene oxide, polybutylene oxide or polytetramethylene oxide. More desirably, R represents a polypropylene oxide. Polypropylene oxides with a molecular weight from about 6,000 to about 25,000 are useful. Desirably, the polypropylene oxides have a molecular weight from about 10,000 to about 20,000, including molecular weights of about 12,000 and about 18,000. Moreover, trialkoxysilyl capped polymers, where $R^3$ is a $C_{1-12}$ alkoxy in formula I, are also useful in the present invention.

Useful alkylsilyl capped plasticizers include those compounds of the following formula:

wherein R' is a hydrocarbon diradical which may include heteroatom and/or silicone-containing groups or linkages; B and B' may be each $C_{1-30}$ linear or branched, substituted or unsubstituted aliphatic groups or aromatic-containing groups, with or without interruption by a carboxy, carbamate, carbonate, ureido, urethane or sulfonate linkage; m may be 0 or 1; $R^4$ and $R^5$ are substituted or unsubstituted $C_{1-12}$ alkyl or aryl groups; $R^6$ is a $C_{1-12}$ alkyl, alkenyl, alkoxy, aminoalkyl or aryl group, or a (meth)acryloxyalkyl group. Moreover, the above-described R backbones may suitably be used for R' in formula II above.

The alkylsilyl capped polymers of the present invention desirably have a viscosity in the range of about 10 cps to about 1,000,000 cps and more desirably about 1,000 cps to about 100,000 cps.

Desirably, in formula II, R' is a polyether that represents a polyethylene oxide, polypropylene oxide, polybutylene oxide or polytetramethylene oxide. More desirably, R' represents a polybutylene oxide or polytetramethylene oxide. Polytetramethylene oxides with a molecular weight from about 650 to about 3,000 are useful. Desirably, the polytetramethylene oxides have a molecular weight from about 1,500 to about 2,500. A molecular weight of about 2,000 is also useful. Moreover, trialkylsilyl capped polymers, where $R^6$ is a $C_{1-12}$ alkyl in formula II, are also useful with the practice of the present invention.

The present composition may also include a filler component. For example, any commercially available precipitated or ground calcium carbonate can be used with the present invention. The precipitated calcium carbonate should be present, for example, in an amount from about 10 to about 70% by weight of the total composition. Desirably, the calcium carbonate is present in an amount from about 40 to about 70% by weight of the total composition. More desirably, the calcium carbonate is present in an amount from about 50% to about 60% by weight of the total composition.

Other fillers may also be used with the present invention. These fillers include, for example, lithopone, zirconium silicate, hydroxides, such as hydroxides of calcium, aluminum, magnesium, iron and the like, diatomaceous earth, carbonates, such as sodium, potassium, and magnesium carbonates, oxides, such as zinc magnesium, chromic, zirconium and aluminum oxides, calcium clay, graphite, synthetic fibers and mixtures thereof.

The compositions of the present invention are not limited to the above-described alkylsilyl capped plasticizers and other non-alkylsilyl plasticizers, such as aliphatic liquid polymers and oils or silicone plasticizers may be used, when it is desirable for the composition or cured elastomer thereof to have physical properties and characteristics that are modified by inclusion of such a material. Other organic plasticizers that can be used in the present invention include, for example, petroleum derived organic oils. Moreover, other suitable organic plasticizers include, for example, alkyl phosphates, polyalkylene glycol, poly(propylene oxides), hydroxyethylated alkyl phenol, dialkyldithiophosphonate, poly(isobutylenes), poly(olefins) and mixtures thereof. One example of a suitable silicone plasticizer is a triorganosilyl end blocked diorganosiloxane, although other silicone plasticizers can be used provided they do not compromise the adhesive properties of the present composition. Desirably, the plasticizer is a polyethylene powder.

In the inventive compositions, effective amounts of plasticizers may be added to aid the workability of the final cured elastomer. From about 5 to about 30% by weight of the total composition of plasticizer may be incorporated into the compositions of the present invention. Desirably, from about 5% to about 25% by weight of the total composition of the selected organic plasticizers are incorporated into the compositions of the present invention.

The compositions of the present invention may also include a moisture cure catalyst, for example dialkyltin dicarboxylates, alkyl titanates and metal alkoxides, to increase the rate of curing, including increasing the rate of condensation crosslinking reactions. Nonlimited examples of moisture cure catalysts include, for example, dibutyltin dilaurate, dibutyltin diacetate, dibutyltin dioctoate, dibutyltin maleate, dialkyl tin hexoate, dioctyltin dilaurate, iron octanoate, zinc octanoate, lead octanoate, cobalt naphthenate, tetrapropyltitanate and tetrabutyltitanate. Other conventional catalysts can also be incorporated into the present invention. For example, the inventive compositions also include an addition cure catalyst. Suitable addition cure catalysts that can be used with the present compositions include platinum-based ones, such as platinum-siloxane complexes, which facilitate hydrosilation reactions. Elevated temperatures may also be used to cure the inventive compositions of the present invention. The catalysts may be used in an amount within the range of about 0.001% to about 1% by weight of the total composition. Desirably, the catalyst is present from about 0.01% to about 0.1% weight of the total composition. Photoinitiators, such as visible and UV initiators may also be incorporated.

Desirably, the inventive compositions include an adhesion promoter. Such an adhesion promoter can include, for example, octyl trimethoxysilane, glycidyl trimethoxysilane, methacryloxypropyl trimethoxysilane, vinyl trimethoxysilane, glycidoxypropyltrimethoxysilane, aminopropyltrimethoxysilane, methacryloxypropyltrimethoxy-silane, triallyl-5-tria-zine-2,3,6(1H.3H.5H)-trione aminoethylaminopropyltrimethoxysilane. Desirably, the adhesion promoter is 3-aminopropyltrimethoxysilane. The adhesion promoters, when present, may be used in an amount within the range of about 0.1% to about 10% by weight of the total composition. Desirably, the adhesion promoter is present from about 1% to about 5% by weight on the total composition.

The inventive compositions cure at room temperature, i.e., from about 30° C. to about 40° C., through moisture curing reactions. Increasing the curing temperature of the compositions of the present invention also improve their adhesion to polyolefin substrates, particularly polyethylene and polypropylene substrates. For example, curing temperatures up to about 150° C. or greater are useful. Desirably, curing temperatures from about 70° C. to about 100° C. are used. More desirably, curing temperatures from about 80 to about 85° C., for example 82° C., are useful with the present invention. The above use of elevated temperature should be balanced, of course, with the ability of the underlying substrate to withstand the temperature.

The compositions in the present invention can include various other components useful in the manufacturing of moisture curable products. For example, various moisture catalysts, fillers, stabilizers, inhibitors, reactive diluents, viscosity modifiers and the like may be incorporated at useful ranges for their intended purposes.

Figure 1:
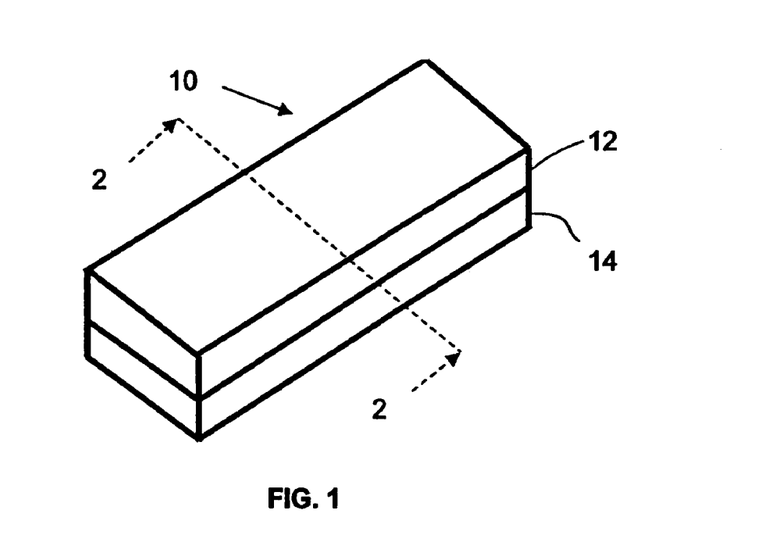
FIG. 1 is a perspective view of a laminate having polyolefin substrates according to the present invention.
Figure 2:
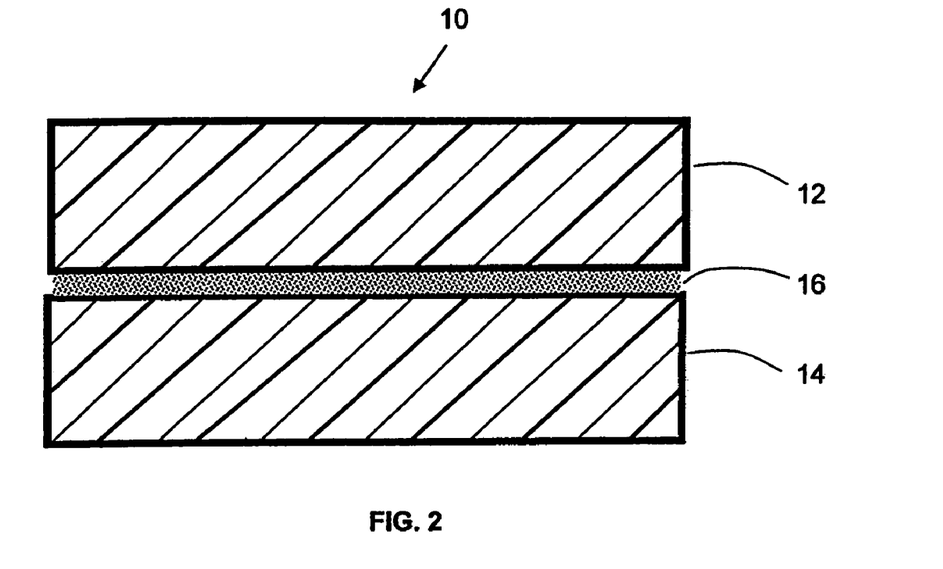
FIG. 2 is a cross sectional view of the laminate of FIG. 1 showing a layer of inventive adhesive securely joining the polyolefin substrates.

As depicted in FIGS. 1 and 2, the compositions of the present invention are useful for producing articles of manufacture, especially articles of manufacture that contain polyolefin, for example polyethylene or polypropylene, substrates. An article of manufacture 10 is depicted in FIG. 1. The article 10 includes polyolefin substrate 12 securably attached to a polyolefin substrate 14. As depicted in FIG. 2, which is a cross section view of the article 10 taken along the 2-2 axis, polyolefin substrates 12 and 14 are securably attached to one and the other by cured adhesive layer 16. Cured adhesive layer 16 represents the cured compositions of the present invention.

A method of bonding polyolefin substrates is also included within the scope of the present invention. Polyolefin substrates, for instance polyethylene or polypropylene substrates, are secured to one and the other by applying the inventive compositions therebetween. The inventive compositions adhesively join the substrates upon curing, for example through moisture curing. Adhesion of the inventive compositions to the polyolefin substrates can be further improved by increasing the cure temperature above room temperature, as described above.

The following non-limiting examples are intended to further illustrate the present invention.

EXAMPLES

Example 1

Inventive Compositions were prepared as described in Table 1 below. The triethyloxysilyl capped polyethylene oxide polymer A was prepared by heating a mixture of about 95 weight parts ACCLAIM 12200 (a polypropylene oxide polymer with OH endgroups having a molecular weight of about 12000 from Lyondell) with about 5 weight parts SILQUEST A1310 (isocyanatopropyltriethoxysilane from Crompton) in the presence of dimethyltin dicarboxylate, a tin catalyst, at 35° C. to 60° C. for about 3 hours. The remaining ingredients were admixed to form Inventive Composition Nos. 1-6, as shown below.

TABLE 1

| Component (wt %): | Inventive Composition Nos. | | | | | |
|---|---|---|---|---|---|---|
| | 1 | 2 | 3 | 4 | 5 | 6 |
| triethyloxysilyl capped polyethylene oxide | 98.7 | 97.6 | 61.4 | 60.7 | 61.3 | 60.6 |
| plasticizer | | | 18.4 | 18.2 | 18.4 | 18.2 |
| calcium carbonate filler | | | 18.4 | 18.2 | 18.4 | 18.2 |
| Tin catalyst | 0.2 | 0.2 | 0.1 | 0.1 | 0.2 | 0.2 |
| vinyl trimethoxy silane | | 0.6 | | | | |
| vinyl triethoxy silane | | | | | | |
| 3-aminopropyltrimethoxysilane | 1.1 | 1.6 | 1.7 | 2.8 | 1.5 | 2.8 |
| 3-aminopropyltriethoxysilane | | | | | | |
| TOTAL (wt %) | 100% | 100% | 100% | 100% | 100% | 100% |

Inventive Composition Nos. 1-6 were applied to low density polyethylene lap shears (1½ inches by 1 inch with a thickness of 0.04 inches). Curing conditions, i.e., cure temperatures and time, were varied and are shown below in Table A-1. All composition cured to the lap shears. Increasing the calcium carbonate filler improved the lap shear strength.

TABLE A-1

Low-Density Polyethylene (TS210) Lap Shears: Lap Shear Testing Results

| Inventive Composition Nos. | Cure Temp. | Cure Time, days | Shear Strength, psi | Joint Movement, inches | Failure Mode |
|---|---|---|---|---|---|
| 1 | RT | 7 | 2 | 0.028 | AF |
| 2 | RT | 7 | 12 | 0.039 | AF |
| 3 | RT | 7 | 35 | 0.032 | AF |
| 3 | RT/hot | 7 | 37 | 0.035 | AF |
| 4 | RT | 7 | 34 | 0.057 | AF |
| 4 | RT/hot | 7 | 47 | 0.045 | AF |
| 5 | RT | 7 | 30 | 0.027 | AF |
| 5 | RT/hot | 7 | 38 | 0.039 | AF |
| 6 | RT | 7 | 48 | 0.047 | AF |
| 6 | RT/hot | 7 | 36 | 0.032 | AF |
| 1 | 50° C. | 7 | 3 | 0.029 | AF |
| 2 | 50° C. | 7 | 17 | 0.039 | AF |
| 3 | 50° C. | 7 | 38 | 0.037 | AF |
| 4 | 50° C. | 7 | 81 | 0.093 | AF |
| 5 | 50° C. | 7 | 83 | 0.104 | AF |
| 6 | 50° C. | 7 | 93 | 0.121 | AF |
| 3 | 82° C. | 7 | 7 | 0.013 | AF |
| 4 | 82° C. | 7 | 24 | 0.024 | MMF |
| 5 | 82° C. | 7 | 57 | 0.066 | AF |
| 6 | 82° C. | 7 | 92 | 0.110 | MMF |

Notes:
RT: room temperature
AF: adhesive failure
CF: cohesive failure
MMF: mixed mode of failure (partial AF and partial CF)

Inventive Composition Nos. 1-6 were applied to high density polyethylene lap shears (1½ inches by 1 inch with a thickness of 0.04 inches). Curing conditions, i.e., cure temperatures and time, were varied and are shown below in Table B-1. All composition cured to the lap shears. Increasing the calcium carbonate filler generally improved the lap shear strengths, particularly at room temperature curing conditions.

TABLE B-1

High-Density Polyethylene (TS227) Block Shears:
Lap Shear Testing Results

| Inventive Composition Nos. | Cure Temp. | Cure Time, days | Shear Strength, psi | Joint Movement, inches | Failure Mode |
|---|---|---|---|---|---|
| 1 | RT | 7 | 74 | 0.042 | AF |
| 2 | RT | 7 | 85 | 0.030 | AF |
| 3 | RT | 7 | 68 | 0.034 | AF |
| 3 | RT/hot | 7 | 78 | 0.040 | AF |
| 4 | RT | 7 | 70 | 0.021 | AF |
| 4 | RT/hot | 7 | 85 | 0.026 | AF |
| 5 | RT | 7 | 90 | 0.040 | AF |
| 5 | RT/hot | 7 | 82 | 0.023 | AF |
| 6 | RT | 7 | 88 | 0.043 | MMF |
| 6 | RT/hot | 7 | 84 | 0.024 | AF |
| 1 | 50° C. | 7 | 140 | 0.061 | MMF |
| 2 | 50° C. | 7 | 203 | 0.076 | MMF |
| 3 | 50° C. | 7 | 79 | 0.040 | AF |
| 4 | 50° C. | 7 | 94 | 0.041 | MMF |
| 5 | 50° C. | 7 | 85 | 0.035 | AF |
| 6 | 50° C. | 7 | 128 | 0.059 | MMF |
| 3 | 82° C. | 7 | 13 | 0.010 | MMF |
| 4 | 82° C. | 7 | 52 | 0.011 | MMF |
| 5 | 82° C. | 7 | 70 | 0.022 | MMF |
| 6 | 82° C. | 7 | 7 | 0.008 | MMF |

Notes:
RT: room temperature
AF: adhesive failure
CF: cohesive failure
MMF: mixed mode of failure (partial AF and partial CF)

Inventive Composition Nos. 1-6 were applied to polypropylene lap shears (1½ inches by 1 inch with a thickness of 0.04 inches). Curing conditions, i.e., cure temperatures and time, were varied and are shown below in Table C-1. All composition cured to the lap shears. Increasing the calcium carbonate filler generally improved the lap shear strengths, particularly at room temperature curing conditions.

TABLE C-1

Polypropylene (TS226) Block Shears:
Lap Shear Testing Results

| Inventive Composition Nos. | Cure Temp. | Cure Time, days | Shear Strength, psi | Joint Movement, inches | Failure Mode |
|---|---|---|---|---|---|
| 1 | RT | 7 | 17 | 0.018 | AF |
| 2 | RT | 7 | 48 | 0.019 | AF |
| 3 | RT | 7 | 37 | 0.012 | AF |
| 3 | RT/hot | 7 | 40 | 0.012 | AF |
| 4 | RT | 7 | 20 | 0.010 | AF |
| 4 | RT/hot | 7 | 39 | 0.008 | AF |
| 5 | RT | 7 | 42 | 0.011 | AF |
| 5 | RT/hot | 7 | 17 | 0.006 | AF |
| 6 | RT | 7 | 40 | 0.012 | AF |
| 6 | RT/hot | 7 | 61 | 0.032 | AF |
| 1 | 50° C. | 7 | 29 | 0.016 | AF |
| 2 | 50° C. | 7 | 49 | 0.019 | AF |
| 3 | 50° C. | 7 | 26 | 0.009 | AF |
| 4 | 50° C. | 7 | 65 | 0.016 | AF |
| 5 | 50° C. | 7 | 22 | 0.008 | AF |
| 6 | 50° C. | 7 | 54 | 0.014 | AF |
| 3 | 82° C. | 7 | 10 | 0.010 | M |
| 4 | 82° C. | 7 | 44 | 0.013 | AF |
| 5 | 82° C. | 7 | 7 | 0.008 | AF |
| 6 | 82° C. | 7 | 8 | 0.009 | AF |

Notes:
RT: room temperature
AF: adhesive failure
CF: cohesive failure
MMF: mixed mode of failure (partial AF and partial CF)

Example 2

Inventive Compositions were prepared as described in Table 2 below. The triethyloxysilyl capped polyethylene oxide polymer was prepared by heating a mixture of about 95 weight parts ACCLAIM 12000 (a polypropylene oxide polymer with OH endgroups having a molecular weight of about 12000 from Lyondell) with about 5 weight parts SILQUEST A1310 (isocyanatopropyltriethoxysilane from Crompton) in the presence of dimethyltin dicarboxylate, a tin catalyst, at 35° C. to 60° C. for about 3 hours. The trimethylsilyl capped polytetramethylene oxide polymer was prepared by capping polytetramethylene ether glycol (POLYMEG 2000 from Lyondell) with tetramethylxylylene diisocyanate (TMXDI) and n-ethylaminopropyltrimethoxysilane. The remaining ingredients were admixed to form Inventive Compositions Nos. 7-13, as shown below.

TABLE 2

| Component (wt %): | Inventive Composition Nos. | | | | | | |
|---|---|---|---|---|---|---|---|
| | 7 | 8 | 9 | 10 | 11 | 12 | 13 |
| triethyloxysilyl capped polyethylene oxide | 14.3 | 14.1 | | | | | 9.3 |
| trimethylsilyl capped polytetramethylene oxide | | | 17.5 | 17.2 | 20.4 | 20.1 | 10.0 |
| plasticizer | 14.3 | 14.1 | 17.5 | 17.2 | 15.9 | 15.8 | 17.1 |
| calcium carbonate filler | 47.6 | 46.9 | 63.0 | 62.1 | 44.3 | 43.8 | 52.8 |
| polyethylene powder | 22.1 | 22.1 | | | 17.7 | 17.5 | 8.7 |
| Tin catalyst | 0.1 | 0.1 | 0.1 | 0.1 | 0.1 | 0.1 | 0.1 |
| vinyl trimethoxy silane | | | 0.4 | 0.4 | | | |
| vinyl triethoxy silane | | | | | | | |
| 3-aminopropyl-trimethoxysilane | 1.6 | 2.7 | 1.5 | 3.0 | 1.6 | 2.7 | 2.0 |
| 3-aminopropyl-triethoxysilane | | | | | | | |
| TOTAL (wt %) | 100% | 100% | 100% | 100% | 100% | 100% | 100% |

Inventive Composition Nos. 7-13 were applied to low density polyethylene lap shears (1½ inches by 1 inch with a thickness of 0.04 inches). Curing conditions, i.e., cure temperatures and time, were varied and are shown below in Table A-2. All composition cured to the lap shears. The incorporation of calcium carbonate filler and an adhesion promoter, i.e., aminopropyltrimethoxysilane, improved the lap shear strength. Moreover, the inclusion of both the triethyloxysilyl capped polyethylene oxide polymer and the trimethylsilyl capped polytetramethylene oxide plasticizer improved the lap shear strength.

TABLE A-2

Low-Density Polyethylene (TS210) Lap Shears:
Lap Shear Testing Results

| Inventive Composition Nos. | Cure Temp. | Cure Time, days | Shear Strength, psi | Joint Movement, inches | Failure Mode |
|---|---|---|---|---|---|
| 7 | RT | 8 | 67 | 0.071 | MMF |
| 8 | RT | 8 | 72 | 0.078 | MMF |
| 9 | RT | 7 | 70 | 0.082 | AF |
| 9 | RT | 17 | 101 | 0.123 | AF |
| 10 | RT | 7 | 53 | 0.058 | AF |
| 10 | RT | 17 | 96 | 0.101 | AF |
| 11 | RT | 10 | 38 | 0.030 | AF |
| 11 | RT | 14 | 70 | 0.073 | AF |
| 12 | RT | 10 | 70 | 0.072 | AF |

TABLE A-2-continued

Low-Density Polyethylene (TS210) Lap Shears:
Lap Shear Testing Results

| Inventive Composition Nos. | Cure Temp. | Cure Time, days | Shear Strength, psi | Joint Movement, inches | Failure Mode |
|---|---|---|---|---|---|
| 12 | RT | 14 | 100 | 0.102 | AF |
| 13 | RT | 7 | 48 | 0.050 | MMF |
| 7 | 50° C./RT | 7/7 | 82 | 0.112 | AF |
| 8 | 50° C./RT | 7/7 | 68 | 0.095 | AF |
| 11 | 50° C. | 10 | 68 | 0.080 | AF |
| 12 | 50° C. | 10 | 87 | 0.094 | AF |
| 7 | 82° C./RT | 4/4 | 148 | 0.173 | CF |
| 8 | 82° C./RT | 4/4 | 139 | 0.233 | CF |
| 9 | 82° C./RT | 3/4 | 118 | 0.203 | MMF |
| 9 | 82° C. | 7 | 108 | 0.219 | AF |
| 9 | 82° C. | 17 | 144 | 0.206 | AF |
| 10 | 82° C. | 7 | 119 | 0.224 | AF |
| 10 | 82° C. | 17 | 69 | 0.080 | AF |
| 11 | 82° C. | 11 | 135 | 0.261 | MMF |
| 11 | 82° C. | 25 | 125 | 0.141 | AF |
| 12 | 82° C. | 11 | 95 | 0.105 | AF |
| 12 | 82° C. | 25 | 100 | 0.115 | AF |
| 13 | 82° C./RT | 7 | 112 | 0.195 | MMF |

Notes:
RT: room temperature
AF: adhesive failure
CF: cohesive failure
MMF: mixed mode of failure (partial AF and partial CF)

Inventive Composition Nos. 7-13 were applied to high density polyethylene lap shears (1½ inches by 1 inch with a thickness of 0.04 inches). Curing conditions, i.e., cure temperatures and time, were varied and are shown below in Table B-2. All composition cured to the lap shears. The incorporation of calcium carbonate filler and an adhesion promoter, i.e., aminopropyltrimethoxysilane, improved the lap shear strength. Moreover, the inclusion of both the triethyloxysilyl capped polyethylene oxide polymer and the trimethylsilyl capped polytetramethylene oxide plasticizer improved the lap shear strength.

TABLE B-2

High-Density Polyethylene (TS227) Block Shears:
Lap Shear Testing Results

| Inventive Composition Nos. | Cure Temp. | Cure Time, days | Shear Strength, psi | Joint Movement, inches | Failure Mode |
|---|---|---|---|---|---|
| 7 | RT | 8 | 109 | 0.027 | MMF |
| 8 | RT | 8 | 56 | 0.013 | AF |
| 9 | RT | 7 | 47 | 0.021 | AF |
| 9 | RT | 17 | 57 | 0.014 | MMF |
| 10 | RT | 7 | 74 | 0.019 | AF |
| 10 | RT | 17 | 171 | 0.028 | AF |
| 11 | RT | 10 | 73 | 0.021 | AF |
| 11 | RT | 14 | 76 | 0.022 | AF |
| 12 | RT | 10 | 96 | 0.018 | AF |
| 12 | RT | 14 | 184 | 0.030 | AF |
| 13 | RT | 7 | 65 | 0.026 | MMF |
| 7 | 50° C./RT | 7/7 | 83 | 0.023 | MMF |
| 8 | 50° C./RT | 7/7 | 91 | 0.025 | MMF |
| 11 | 50° C. | 10 | 134 | 0.027 | AF |
| 12 | 50° C. | 10 | 201 | 0.031 | AF |
| 7 | 82° C./RT | 4/4 | 63 | 0.018 | 80% CF |
| 8 | 82° C./RT | 4/4 | 32 | 0.009 | AF |
| 9 | 82° C./RT | 3/4 | 176 | 0.049 | MMF |
| 9 | 82° C. | 7 | 183 | 0.031 | AF |
| 9 | 82° C. | 17 | 170 | 0.036 | AF |
| 10 | 82° C. | 7 | 213 | 0.025 | MMF |
| 10 | 82° C. | 17 | 212 | 0.024 | MMF |
| 11 | 82° C. | 11 | 150 | 0.032 | MMF |

TABLE B-2-continued

High-Density Polyethylene (TS227) Block Shears:
Lap Shear Testing Results

| Inventive Composition Nos. | Cure Temp. | Cure Time, days | Shear Strength, psi | Joint Movement, inches | Failure Mode |
|---|---|---|---|---|---|
| 11 | 82° C. | 25 | 63 | 0.023 | AF |
| 12 | 82° C. | 11 | 179 | 0.025 | MMF |
| 12 | 82° C. | 25 | 129 | 0.024 | AF |
| 13 | 82° C./RT | 7 | 240 | 0.04 1 | MMF |

Notes:
RT: room temperature
AF: adhesive failure
CF: cohesive failure
MMF: mixed mode of failure (partial AF and partial CF)

Inventive Composition Nos. 7-13 were applied to polypropylene lap shears (1½ inches by 1 inch with a thickness of 0.04 inches). Curing conditions, i.e., cure temperatures and time, were varied and are shown below in Table C-2. All composition cured to the lap shears. The incorporation of calcium carbonate filler and an adhesion promoter, i.e., aminopropyl-trimethoxysilane, improved the lap shear strength. Moreover, the inclusion of both the triethyloxysilyl capped polyethylene oxide polymer and the trimethylsilyl capped polytetramethylene oxide plasticizer improved the lap shear strength.

TABLE C-2

Polypropylene (TS226) Block Shears:
Lap Shear Testing Results

| Inventive Composition Nos. | Cure Temp. | Cure Time, days | Shear Strength, psi | Joint Movement, inches | Failure Mode |
|---|---|---|---|---|---|
| 7 | RT | 8 | 53 | 0.009 | AF |
| 8 | RT | 8 | 86 | 0.016 | MMF |
| 9 | RT | 7 | 28 | 0.008 | AF/ 90% CF |
| 9 | RT | 17 | | | |
| 10 | RT | 7 | 36 | 0.009 | AF/ 55% CF |
| 10 | RT | 17 | | | |
| 11 | RT | 10 | 46 | 0.012 | AF |
| 11 | RT | 14 | 58 | 0.015 | AF |
| 12 | RT | 10 | 86 | 0.018 | AF |
| 12 | RT | 14 | 11 | 0.014 | AF |
| 13 | RT | 7 | 15 | 0.008 | AF |
| 7 | 50° C./RT | 7/7 | 83 | 0.019 | AF |
| 8 | 50° C./RT | 7/7 | 86 | 0.017 | AF |
| 11 | 50° C. | 10 | 149 | 0.025 | AF |
| 12 | 50° C. | 10 | 31 | 0.0006 | AF |
| 7 | 82° C./RT | 4/4 | 84 | 0.014 | MMF |
| 8 | 82° C./RT | 4/4 | 95 | 0.018 | AF |
| 9 | 82° C./RT | 3/4 | 72 | 0.016 | AF |
| 9 | 82° C. | 7 | 35 | 0.012 | AF |
| 9 | 82° C. | 17 | 50 | 0.022 | AF |
| 10 | 82° C. | 7 | 29 | 0.007 | AF |
| 10 | 82° C. | 17 | 63 | 0.012 | AF |
| 11 | 82° C. | 11 | 115 | 0.021 | AF |
| 11 | 82° C. | 25 | 144 | 0.024 | AF |
| 12 | 82° C. | 11 | 84 | 0.012 | AF |
| 12 | 82° C. | 25 | 61 | 0.014 | AF |
| 13 | 82° C./RT | 7 | 205 | 0.026 | MMF |

Notes:
RT: room temperature
AF: adhesive failure
CF: cohesive failure
MMF: mixed mode of failure (partial AF and partial CF)

Example 3

Inventive Compositions were prepared as described in Table 3 below. The triethyloxysilyl capped polyethylene oxide polymer was prepared by heating a mixture of about 95 weight parts ACCLAIM 18000 (a polypropylene oxide polymer with OH endgroups having a molecular weight of about 18000 from Lyondell) with about 5 weight parts SILQUEST A1310 (isocyanatopropyltriethoxysilane from Crompton) in the presence of dimethyltin dicarboxylate, a tin catalyst, at 35° C. to 60° C. for about 3 hours. The trimethylsilyl capped polytetramethylene oxide polymer was prepared by capping polytetramethylene ether glycol (POLYMEG 2000 from Lyondell) with tetramethylxylylene diisocyanate (TMXDI) and n-ethylaminopropyltrimethoxysilane. The remaining ingredients were admixed to form Inventive Compositions Nos. 14-18, as shown below.

TABLE 3

| | Inventive Composition Nos. | | | | |
|---|---|---|---|---|---|
| Component (wt %): | 14 | 15 | 16 | 17 | 18 |
| triethyloxysilyl capped polyethylene oxide | 49.4 | 24.7 | | | 10.0 |
| trimethylsilyl capped polytetramethylene oxide | 10.1 | 34.8 | 59.5 | 28.0 | 28.0 |
| calcium carbonate filler | 21.9 | 21.9 | 21.9 | | |
| polyethylene powder | 8.7 | 8.7 | 8.7 | 50.0 | 50.0 |
| Plasticizer | 7.9 | 7.9 | 7.9 | 20.0 | 10.0 |
| 3-aminopropyltrimethoxysilane | 1.9 | 1.9 | 1.9 | 1.9 | 1.9 |
| tin catalyst | 0.1 | 0.1 | 0.1 | 0.1 | 0.1 |
| TOTAL (wt %) | 100% | 100% | 100% | 100% | 100% |

Inventive Composition Nos. 14-18 were applied to low density polyethylene lap shears (1½ inches by 1 inch with a thickness of 0.04 inches). Curing conditions, i.e., cure temperatures and time, were varied and are shown below in Table A-3. All composition cured to the lap shears. Increasing the calcium carbonate filler improved the lap shear strength. Moreover, the inclusion of both the triethyloxysilyl capped polyethylene oxide polymer and the trimethylsilyl capped polytetramethylene oxide plasticizer improved the lap shear strength.

TABLE A-3

Low-Density Polyethylene (TS210) Lap Shears:
Lap Shear Testing Results

| Inventive Composition Nos. | Cure Temp. | Cure Time, days | Shear Strength, psi | Joint Movement, inches | Failure Mode |
|---|---|---|---|---|---|
| 14 | RT | 7 | 23 | 0.035 | AF |
| 15 | RT | 16 | | | |
| 16 | RT | 16 | 46 | 0.031 | AF |
| 14 | 82° C./RT | 7 | 41 | 0.073 | AF |
| 15 | 82° C. | 6 | 47 | 0.049 | AF |
| 15 | 82° C. | 13 | 46 | 0.044 | AF |
| 16 | 82° C. | 6 | 26 | 0.037 | AF |
| 16 | 82° C. | 13 | 46 | 0.049 | AF |
| 17 | 82° C. | 7 | 35 | 0.039 | CF |
| 17 | 82° C. | 14 | 44 | 0.034 | CF |
| 18 | 82° C. | 7 | 66 | 0.079 | MMF |
| 18 | 82° C. | 14 | 82 | 0.077 | CF |

Notes:
RT: room temperature
AF: adhesive failure
CF: cohesive failure
MMF: mixed mode of failure (partial AF and partial CF)

Inventive Composition Nos. 14-18 were applied to high density polyethylene lap shears (1½ inches by 1 inch with a thickness of 0.04 inches). Curing conditions, i.e., cure temperatures and time, were varied and are shown below in Table B-3. All composition cured to the lap shears. Increasing the calcium carbonate filler generally improved the lap shear strengths, particularly at room temperature curing conditions. Moreover, the inclusion of both the triethyloxysilyl capped polyethylene oxide polymer and the trimethylsilyl capped polytetramethylene oxide plasticizer improved the lap shear strength.

TABLE B-3

High-Density Polyethylene (TS227) Block Shears:
Lap Shear Testing Results

| Inventive Composition Nos. | Cure Temp. | Cure Time, days | Shear Strength, psi | Joint Movement, inches | Failure Mode |
|---|---|---|---|---|---|
| 14 | RT | 7 | 66 | 0.019 | AF |
| 15 | RT | 16 | 86 | 0.017 | AF |
| 16 | RT | 16 | 132 | 0.021 | AF |
| 14 | 82° C./RT | 7 | 89 | 0.035 | AF |
| 15 | 82° C. | 6 | 70 | 0.018 | AF |
| 15 | 82° C. | 13 | 107 | 0.041 | AF |
| 16 | 82° C. | 6 | 101 | 0.025 | AF |
| 16 | 82° C. | 13 | 103 | 0.023 | AF |
| 17 | 82° C. | 7 | 29 | 0.014 | CF |
| 17 | 82° C. | 14 | 22 | 0.022 | CF |
| 18 | 82° C. | 7 | 48 | 0.014 | CF |
| 18 | 82° C. | 14 | 67 | 0.025 | CF |

Notes:
RT: room temperature
AF: adhesive failure
CF: cohesive failure
MMF: mixed mode of failure (partial AF and partial CF)

Inventive Composition Nos. 14-18 were applied to polypropylene lap shears (1½ inches by 1 inch with a thickness of 0.04 inches). Curing conditions, i.e., cure temperatures and time, were varied and are shown below in Table C-3. All composition cured to the lap shears. Increasing the calcium carbonate filler generally improved the lap shear strengths, particularly at room temperature curing conditions. Moreover, the inclusion of both the triethyloxysilyl capped polyethylene oxide polymer and the trimethylsilyl capped polytetramethylene oxide plasticizer improved the lap shear strength.

TABLE C-3

Polypropylene (TS226) Block Shears:
Lap Shear Testing Results

| Inventive Composition Nos. | Cure Temp. | Cure Time, days | Shear Strength, psi | Joint Movement, inches | Failure Mode |
|---|---|---|---|---|---|
| 14 | RT | 7 | 8 | 0.043 | AF |
| 15 | RT | 16 | 30 | 0.008 | AF |
| 16 | RT | 16 | 72 | 0.012 | AF |
| 14 | 82° C./RT | 7 | 33 | 0.014 | AF |
| 15 | 82° C. | 6 | 64 | 0.023 | AF |
| 15 | 82° C. | 13 | 21 | 0.015 | AF |
| 16 | 82° C. | 6 | 2 | 0.013 | AF |
| 16 | 82° C. | 13 | 54 | 0.015 | AF |
| 17 | 82° C. | 7 | 28 | 0.018 | CF |
| 17 | 82° C. | 14 | 22 | 0.019 | CF |

TABLE C-3-continued

Polypropylene (TS226) Block Shears:
Lap Shear Testing Results

| Inventive Composition Nos. | Cure Temp. | Cure Time, days | Shear Strength, psi | Joint Movement, inches | Failure Mode |
|---|---|---|---|---|---|
| 18 | 82° C. | 7 | 40 | 0.014 | AF |
| 18 | 82° C. | 14 | 63 | 0.024 | CF |

Notes:
RT: room temperature
AF: adhesive failure
CF: cohesive failure
MMF: mixed mode of failure (partial AF and partial CF)

Example 4

Inventive Compositions were prepared as described in Table 4 below. A polydimethylsiloxane with vinyldimethoxysilyl groups having a viscosity of about 5000 mPas and the remaining ingredients were admixed to form Inventive Compositions Nos. 19-22, as shown below.

TABLE 4

| | Inventive Composition Nos. | | | |
|---|---|---|---|---|
| Component (wt %): | 19 | 20 | 21 | 22 |
| polydimethylsiloxane with vinyldimethoxysilyl groups | 40.5 | 33.5 | 30.6 | 32.8 |
| calcium carbonate filler | | 44.6 | 56.8 | 65.5 |
| polyethylene powder | 57.7 | 20.1 | 10.9 | |
| 3-aminopropyltrimethoxysilane | 1.7 | 1.7 | 1.6 | 1.6 |
| tin catalyst | 0.1 | 0.1 | 0.1 | 0.1 |
| TOTAL (wt %) | 100% | 100% | 100% | 100% |

Inventive Composition Nos. 19-22 were applied to low density polyethylene lap shears (1½ inches by 1 inch with a thickness of 0.04 inches). Curing conditions, i.e., cure temperatures and time, were varied and are shown below in Table A-4. All composition cured to the lap shears. Increasing the calcium carbonate filler improved the lap shear strength.

TABLE A-4

Low-Density Polyethylene (TS210) Lap Shears:
Lap Shear Testing Results

| Inventive Composition Nos. | Cure Temp. | Cure Time, days | Shear Strength, psi | Joint Movement, inches | Failure Mode |
|---|---|---|---|---|---|
| 19 | 82° C. | 6 | 46 | 0.052 | CF |
| 19 | 82° C. | 13 | 44 | 0.035 | CF |
| 20 | 82° C. | 8 | 157 | 0.256 | 90% CF |
| 21 | 82° C. | 5 | 98 | 0.086 | AF |
| 22 | 82° C. | 5 | 170 | 1.000 | CF |

Notes:
AF: adhesive failure
CF: cohesive failure
MMF: mixed mode of failure (partial AF and partial CF)

Inventive Composition Nos. 19-22 were applied to high density polyethylene lap shears (1½ inches by 1 inch with a thickness of 0.04 inches). Curing conditions, i.e., cure temperatures and time, were varied and are shown below in Table B-4. All composition cured to the lap shears. Increasing the calcium carbonate filler generally improved the lap shear strengths, particularly at room temperature curing conditions.

TABLE B-4

High-Density Polyethylene (TS227) Block Shears:
Lap Shear Testing Results

| Inventive Composition Nos. | Cure Temp. | Cure Time, days | Shear Strength, psi | Joint Movement, inches | Failure Mode |
|---|---|---|---|---|---|
| 19 | 82° C. | 6 | 31 | 0.008 | CF |
| 19 | 82° C. | 13 | 45 | 0.015 | CF |
| 20 | 82° C. | 8 | 165 | 0.049 | CF |
| 21 | 82° C. | 5 | 217 | 0.040 | 30% CF |
| 22 | 82° C. | 5 | 279 | 0.053 | AF |

Notes:
AF: adhesive failure
CF: cohesive failure
MMF: mixed mode of failure (partial AF and partial CF)

Inventive Composition Nos. 19-22 were applied to polypropylene lap shears (1½ inches by 1 inch with a thickness of 0.04 inches). Curing conditions, i.e., cure temperatures and time, were varied and are shown below in Table C-4. All composition cured to the lap shears. Increasing the calcium carbonate filler generally improved the lap shear strengths, particularly at room temperature curing conditions.

TABLE C-4

Polypropylene (TS226) Block Shears:
Lap Shear Testing Results

| Inventive Composition Nos. | Cure Temp. | Cure Time, days | Shear Strength, psi | Joint Movement, inches | Failure Mode |
|---|---|---|---|---|---|
| 19 | 82° C. | 6 | 32 | 0.013 | CF |
| 19 | 82° C. | 13 | 39 | 0.018 | CF |
| 20 | 82° C. | 8 | 46 | 0.017 | AF |
| 21 | 82° C. | 5 | 137 | 0.031 | AF |
| 22 | 82° C. | 5 | 20 | 0.011 | AF |

Notes:
AF: adhesive failure
CF: cohesive failure
MMF: mixed mode of failure (partial AF and partial CF)

While the invention has been described in reference to various aspects and embodiments, it will be appreciated that the invention is not limited by these, but may be subject to numerous variations, modifications and other embodiments, all of which are contemplated within the spirit and scope of the invention as claimed.

What is claimed is:

1. A moisture curable composition comprising:
   (a) alkoxysilyl capped polymer compounds within the following formula:

wherein R is a hydrocarbon diradical which may include heteroatom and/or silicone-containing groups or linkages; A and A' are each $C_{1-30}$ linear or branched aliphatic groups or aromatic-containing groups, with or without interruption by a carboxy, carbamate, carbonate, ureido, urethane or sulfonate linkage; n may be 0 or 1; $R^1$ and $R^2$ are $C_{1-12}$ alkyl or aryl groups; $R^3$ is a $C_{1-12}$ alkyl, alkenyl, alkoxy, aminoalkyl or aryl group, or a (meth)acryloxyalkyl group;

(b) at least one alkylsilyl capped plasticizer within the following formula:

II wherein R' is a hydrocarbon diradical which optionally includes heteroatom and/or silicone-containing groups or linkages; B and B' are each $C_{1-30}$ linear or branched aliphatic groups or aromatic-containing groups, that are optionally interrupted by a linkage selected from the group consisting of carboxy, carbamate, carbonate, ureido, urethane and sulfonate; m is 0 or 1; $R^4$ and $R^5$ are $C_{1-12}$ alkyl or aryl groups; $R^6$ is a $C_{1-12}$ alkyl, alkenyl or aryl group;

(c) a filler; and
(d) a moisture curing catalyst.

2. The composition of claim 1, wherein R is a polyether polymer backbone.

3. The composition of claim 2, wherein the polymer backbone of the alkoxysilyl capped polymer is a polypropylene oxide.

4. The composition of claim 1, wherein $R^3$ is a $C_{1-12}$ alkoxy.

5. The composition of claim 1, wherein $R^6$ is a $C_{1-12}$ alkyl.

6. The composition of claim 1, wherein $R^3$ is a $C_{1-12}$ alkoxy and $R^6$ is a $C_{1-12}$ alkyl.

7. The composition of claim 1, wherein R' is a polyether polymer backbone.

8. The composition of claim 7, wherein the polymer backbone of the alkylsilyl capped polymer is a polytetramethylene oxide.

9. The composition of claim 1, wherein the filler is a calcium carbonate filler.

10. The composition of claim 9, wherein the calcium carbonate filler is present in from about 10 weight percent to about 70 weight percent on a total composition basis.

11. The composition of claim 1, further comprising an adhesion promoter.

12. The composition of claim 11, wherein the adhesion promoter is an aminopropyltrimethoxysilane.

13. The composition of claim 1, further including a non-alkylsilyl capped plasticizer.

14. A moisture curable composition comprising:
(a) an alkoxysilyl capped polymer having a polymer or copolymer backbone selected from the group consisting of polyurethane, silicone, polyamide, polyether, polyester and combinations thereof;
(b) a trialkylsilyl capped polymeric plasticizer having a polymer or copolymer backbone selected from the group consisting of polyurethane, silicone, polyamide, polyether, polyester and combinations thereof;
(c) a filler; and
(d) a moisture curing catalyst
wherein the composition has low temperature adhesion to polyolefin substrates.

15. The composition of claim 14, wherein the composition has room temperature adhesive to polyethylene or polypropylene substrates.

16. A moisture curable composition comprising:
(a) from about 5 weight percent to about 95 weight percent on a total composition basis of trialkoxysilyl capped polymer compounds of the following structure:

I wherein R is a hydrocarbon diradical which may include heteroatom and/or silicone-containing groups or linkages; A and A' are each $C_{1-30}$ linear or branched aliphatic groups or aromatic-containing groups, with or without interruption by a carboxy, carbamate, carbonate, ureido, urethane or sulfonate linkage; n may be 0 or 1; $R^1$ and $R^2$ are $C_{1-12}$ alkyl or aryl groups; $R^3$ is a $C_{1-12}$ alkoxy group;

(b) from about 5 weight percent to about 35 weight percent on a total composition basis of trialkylsilyl capped polymeric plasticizers of the following structure:

II wherein R' is a hydrocarbon diradical which optionally includes heteroatom and/or silicone-containing groups or linkages; B and B' are each $C_{1-30}$ linear or branched aliphatic groups or aromatic-containing groups, that are optionally interrupted by a linkage selected from the group consisting of carboxy, carbamate, carbonate, ureido, urethane and sulfonate; m is 0 or 1; $R^4$ and $R^5$ are substituted or unsubstituted $C_{1-12}$ alkyl or aryl groups; $R^6$ is a $C_{1-12}$ alkyl, alkenyl or aryl group;

(c) from about 1 weight percent to about 5 weight percent on a total composition basis of an aminopropyltrimethoxysilane adhesion promoter;
(d) from about 10 weight percent to about 70 weight percent on a total composition basis of a filler; and
(f) a moisture curing catalyst.

17. The composition of claim 16, wherein the filler is calcium carbonate filler.

18. A method of bonding polyolefin substrates comprising:
(i) selecting a polyolefin substrate;
(ii) selecting a moisture curable composition comprising:
(a) alkoxysilyl capped polymer compounds within the following formula:

I wherein R is a hydrocarbon diradical which may include heteroatom and/or silicone-containing groups or linkages; A and A' are each $C_{1-30}$ linear or branched aliphatic groups or aromatic-containing groups, with or without interruption by a carboxy, carbamate, carbonate, ureido, urethane or sulfonate linkage; n may be 0 or 1; $R^1$ and $R^2$ are $C_{1-12}$ alkyl or aryl groups; $R^3$ is a $C_{1-12}$ alkyl, alkenyl, alkoxy, aminoalkyl or aryl group, or a (meth)acryloxyalkyl group;

(b) an alkylsilyl capped polymer plasticizer within the following formula:

wherein R' is a hydrocarbon diradical which optionally includes heteroatom and/or silicone-containing groups or linkages; B and B' are each $C_{1-30}$ linear or branched aliphatic groups or aromatic-containing groups, that are optionally interrupted by a linkage selected from the group consisting of carboxy, carbamate, carbonate, ureido, urethane and sulfonate; m 0 or 1; $R^4$ and $R^5$ are $C_{1-12}$ alkyl or aryl groups; $R^6$ is a $C_{1-12}$ alkyl, alkenyl or aryl group;

(c) an adhesion promoter;
(d) a filler; and
(e) a moisture curing catalyst;
(iii) applying the moisture curable composition to the polyolefin substrate; and
(iv) curing the moisture curable composition.

19. The method of claim 18, wherein the step of curing includes room temperature curing.

20. The method of claim 18, wherein the step of curing includes curing at temperatures above room temperature.

21. The method of claim 18, wherein the step of selecting a polyolefin substrate includes the selecting of a polyethylene or polypropylene substrate.

22. An article of manufacture comprising:
polyolefin substrates having a cured composition therebetween to adhesively join the substrates to one and the other, wherein the cured composition comprises:

(a) alkoxysilyl capped polymer compounds within the following formula:

wherein R is a hydrocarbon diradical which may include heteroatom and/or silicone-containing groups or linkages; A and A' are each $C_{1-30}$ linear or branched aliphatic groups or aromatic-containing groups, with or without interruption by a carboxy, carbamate, carbonate, ureido, urethane or sulfonate linkage; n may be 0 or 1; $R^1$ and $R^2$ are $C_{1-12}$ alkyl or aryl groups; $R^3$ is a $C_{1-2}$ alkyl, alkenyl, alkoxy, aminoalkyl or aryl group, or a (meth)acryloxyalkyl group;

(b) at least one alkylsilyl capped plasticizer within the following formula:

wherein R' is a hydrocarbon diradical which optionally includes heteroatom and/or silicone-containing groups or linkages; B and B' are each $C_{1-30}$ linear or branched aliphatic groups or aromatic-containing groups, that are optionally interrupted by a linkage selected from the group consisting of carboxy, carbamate, carbonate, ureido, urethane and sulfonate; m may be 0 or 1; $R^4$ and $R^5$ are $C_{1-12}$ alkyl or aryl groups; $R^6$ is a $C_{1-12}$ alkyl, alkenyl or aryl group;

(c) an adhesion promoter;
(d) a filler; and
(f) a moisture curing catalyst.

23. The article of claim 22, wherein the polyolefin substrates include polyethylene or polypropylene substrates.

* * * * *